Feb. 3, 1970  R. L. HURTLE  3,493,815
ELECTRIC PROTECTIVE SYSTEM
Filed July 19, 1967  3 Sheets-Sheet 1

INVENTOR
RALPH L. HURTLE
BY Robert H. Casey
ATTORNEY

INVENTOR
RALPH L. HURTLE
BY Robert N. Casey
ATTORNEY

INVENTOR
RALPH L. HURTLE
BY Robert A. Casey
ATTORNEY

United States Patent Office 3,493,815
Patented Feb. 3, 1970

3,493,815
ELECTRIC PROTECTIVE SYSTEM
Ralph L. Hurtle, West Hartford, Conn., assignor to General Electric Company, a corporation of New York
Filed July 19, 1967, Ser. No. 654,624
Int. Cl. H02h *3/00, 1/02, 7/00*
U.S. Cl. 317—16                                   22 Claims

ABSTRACT OF THE DISCLOSURE

An electrical protection system including circuit interruption means actuated by a control means responsive to fault current including one or more neutral conductors arranged in such close relationship to system power conductors as to form a preferred path for fault current and connected to the conductivity control element of a normally nonconducting three terminal semiconductor device which is connected across the power conductors. Upon occurrence of a fault, current flows in the neutral conductor to the control element of the semiconductor device causing it to conduct, thereby effectively short circuiting the conductors. Increased current flow resulting from the short circuiting actuates standard overcurrent responsive circuit interrupting means in one of the power conductors.

BACKGROUND OF THE INVENTION

Field of the invention

The present invention relates to electrical protective circuits and more particularly to protective circuits of the type which utilize circuit interruption means and to conductor arrangements for use in such circuits.

Discussion of the prior art

The problem of protection of personnel and property against electrical hazards is one of long standing. One of several approaches involves the use of circuit interrupting means responsive to the presence of abnormal conditions or faults in the circuit. Protective devices of this type are subject to a number of limitations particularly in the area of protection of humans from the discomforts of being startled or shocked as well as from injury and death. Many devices of the prior art are exclusively responsive to certain types of faults, e.g., certain devices will detect ground faults but will not detect overcurrents or shorting between conductors. Thus in some instances where more comprehensive protection is desired, two or more types of detection devices have to be utilized.

Further, many of the devices of the prior art are greatly limited in sensitivity, i.e., they will not respond to faults below certain current levels. In many instances these levels are above those capable of causing injury or even death. Another shortcoming of many prior art devices is that they act too sowly to prevent harm under certain conditions. For example, a fault current may be of such value as to be harmful if contacted for any significant period of time. In such a case the speed of response of the circuit interrupting means is all-important, and a slow-acting device is relatively valueless.

Another drawback of the prior art is expense. Many devices of relatively greater sensitivity and speed of response are prohibitively expensive, particularly to the householder who desires protection but has only limited resources to spend in this area. Closely related to the matter of expense is that of simplicity, many prior art devices being involved and cumbersome and thus expensive and difficult to maintain.

OBJECTS OF THE INVENTION

It is an object of the present invention to provide an electrical protection system sensitive to practically every type of fault capable of causing injury.

It is a further object of the invention to provide a circuit of the type described which is sensitive to very low current levels.

It is a further object of the invention to provide a circuit of the type described which is extremely fast acting.

It is a further object of the invention to provide a circuit of the type described which is simple and compact.

It is a further object of the invention to provide a circuit of the type described which is inexpensive.

It is a further object of the invention to provide a circuit of the type described which has very low continuous energy consumption.

A problem which exists in electrical protective circuits of this type is that of replacement of circuit elements after a fault. It may be desirable for the sake of simplicity and convenience to replace as few of the circuit elements upon a fault as possible. Therefore, it is a further object of the invention to provide embodiments of a circuit of the type described wherein all but the most expendable elements may be reused.

SUMMARY OF THE INVENTION

The present invention is primarily concerned with protecting humans from shock or injury rather than protecting electrical equipment, and more specifically, with detecting conditions when they become harmful to life and interrupting the circuit immediately upon detection. For example, there may be instances where overcurrents exist which are too small to actuate standard overcurrent circuit interrupting means in circuit but which can destroy conductor insulation. These overcurrents will not be detected until they cause conditions potentially harmful to life as, for example, where, because of insulation failure, leakage current flows to the load frame. Thus in contrast to the prior art, the present invention is responsive to practically all types of faults capable of causing discomfort or injury. It should be noted that although the present invention is focused on the protection of humans, it will protect against most kinds of hazards to equipment or property. A better appreciation of how this and the other above-mentioned objects are achieved can be obtained by consideration of the following brief summary of the invention.

In accordance with one aspect of the invention, fault current sensed by fault sensing means is used to actuate control means for a standard overcurrent circuit interrupting device. The control means comprises a three terminal semiconductor device connected in shunt across the system power conductors and having its control electrode connected to the fault sensing means. Upon a fault, current sensed by the fault sensing means flows to the control electrode of the semiconductor device causing it to conduct. In its conducting state the semiconductor device effectively short-circuits the power conductors.

This short circuit, known in the art as a "crowbar," performs two functions. First, a person who is in contact with the circuit is protected because most of the current will flow through the short circuit rather than the person. Second, because of the intentionally created short circuit condition, current flow is greatly increased and quickly trips standard overcurrent devices used in the system.

In accordance with another aspect of the invention, the fault sensing means comprises one or more electrically isolated conductors arranged with respect to the system power conductors in such close relationship that it presents a very low inductance path and fault current prefers this path to any other available path such as a path through another power conductor or through other grounded conductive media thus assuring current flow to the above-mentioned control means in the event of a fault.

In accordance with still another aspect of the invention, a protected power utilization system is provided including a conductor cable having outgoing and return power conductors and also having at least one additional conductor in the form of a tubular sheath around one of the other two conductors. This cable is connected to a sensing and automatic switch operating means in such a manner that the flow of a predetermined small amount of current, such as .5 milliampere, causes opening of the automatic switch means. With this conductor construction and circuit arrangement, any damage to the cord which might cause danger, whether to personnel by way of shock or to property by way of fire, is protected against. In the preferred form, the third conductor comprises a flaxible conductive sheath around each of the main power conductors so that regardless of polarity of the connections full protection will be afforded.

The invention will be more fully understood from the following detailed description, and its scope will be pointed out in the appended claims.

DESCRIPTION OF PREFERRED EMBODIMENTS

Figure 1:
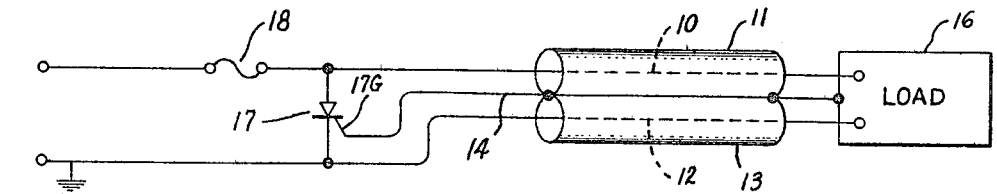
FIGURE 1 is a schematic diagram of an electrical protective circuit incorporating the invention.

In FIGURE 1 the invention is shown as incorporated in an electrical protective circuit for a grounded single phase, two-wire, alternating current system connected to a load. The single phase system includes power conductors 10 and 12 and neutral conductors 11 and 13. Neutral conductor 11 is formed as a metallic sheath coaxial with power conductor 10 and neutral conductor 13 is formed as a metallic sheath coaxial with power conductor 12, which is grounded in accordance with standard practice. The neutral conductors 11 and 13 are electrically common and are connected, through common connection 14, to the frame 16 of the load and to the gating element 17G of a three terminal semiconductor device which is shown here as a silicon controlled rectifier 17. The silicon controlled rectifier 17 is connected in shunt across power conductors 10 and 12. An overcurrent responsive circuit interrupting means, shown here as a fuse 18, is connected in series with power conductor 10.

Figure 2:
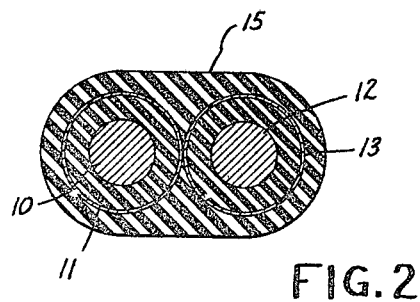
FIGURE 2 is a sectional view of a conductor arrangement used in the circuit of FIGURE 1.

In FIGURE 2 a sectional view of the conductor arrangement of FIGURE 1 is shown and like elements are given like numbers. As stated above, neutral conductors 11 and 13 are formed as metallic sheaths coaxial with power conductors 10 and 12, respectively. The conductor arrangement is provided with suitable insulation 15. The neutral conductors 3 and 4 are electrically common, as stated, being in tangent contact with one another all along their length.

The neutral conductors 11 and 13 provide a low impedance path for fault current from the power conductors so as to insure that upon a fault there will be current flow in this path to actuate associated neutral current responsive circuit interrupting means. By arranging the neutral conductors in close relationship to the protected conductor, the impedance of the path formed by the faulted protected conductor and the neutral conductor is made less than the impedance of a parallel path from the faulted conductor through another power conductor or through ground for the initial stages of a fault. During the first few microseconds after the occurrence of a fault the magnitude of the fault current is low enough that the resistance of available return paths has substantially no effect on the path impedance. Thus path impedance is initially largely determined by path inductance. The path inductance is less for the path through a neutral conductor in accordance with the invention because, briefly, path inductance is proportional to magnetic flux enclosed by the inductance loop formed by the path, and thus to loop size, and the inductance loop formed by the faulted conductor and its neutral is, in the illustrated system, smaller than any other system loop. Thus by making the neutral conductor the path of least impedance for fault current, the flow of fault current to the gating element 17G of silicon controlled rectifier 17 is assured.

Hazards which may arise in using the circuit of FIGURE 1 are generally of two types, burn hazards and shock hazards. A burn hazard may be, for present purposes, defined as one occurring because of arcing between power conductors or between a power conductor and a neutral conductor. This type of hazard occurs where, for any reason, cord insulation fails allowing conduction from a power conductor to a neutral conductor or where the cord is crushed, severed, or cord insulation fails completely, allowing conduction among the power conductors and the neutral conductors. A shock hazard exists where current can flow through a person in contact with the faulty element. It may be present upon the occurrence of any of the types of faults discussed. The chief faults which occur in a circuit like that of FIGURE 1 are: conductor-to-neutral faults, conductor-to-neutral-to-conductor faults, conductor-to-enclosure faults, immersion faults where load insulation fails because of immersion of the load in water, and neutral-to-ground faults where outer insulation fails allowing a neutral conductor to contact ground.

The operation of the invention as embodied in the circuit of FIGURE 1 for a typical fault will now be considered.

Assume a fault from power conductor 10 to load enclosure 16 occurring on a positive portion of the current cycle. Fault current, as described above, initially prefers the low impedance path from conductor 10 to neutral conductor 11 and common connection 14 to any other available path in the system, e.g., to a path from power conductor 12 to ground through the load frame. Thus fault current in common connection 14 flows to gating element 17G and turns silicon controlled rectifier 17 on. Silicon controlled rectifier 17 in its conducting state provides a low resistance shunt path between conductors 10 and 12, and thus effectively short circuits the load. As was mentioned above, this action is known as "crowbarring." With the load effectively short circuited, the current flow in power conductors 10 and 12 is greatly increased, actuating overcurrent circuit interrupting means, i.e., causing fuse 18 to blow.

It is very important to note that a person in contact with the circuit of the invention is protected from experiencing full voltage from the instant the circuit is crowbarred. This is a distinct advantage over other systems, in which a signal must be generated and applied to a circuit breaker to cause tripping and interruption before protection is provided.

In the case of a fault from conductor 10 to load enclosure 16 occurring during a negative half cycle, inspection of FIGURE 1 reveals that during this part of the cycle the silicon controlled rectifier 17 will not fire because its anode is negative with respect to its cathode, and thus there is no circuit interruption. However, even though there is no circuit interruption, an ungrounded person receives no shock from the enclosure 6 because there is no path for fault current either to ground or to conductor 12. In contrast, a grounded person who is in contact with enclosure 16 passes current for one half cycle maximum. It is noted that with a voltage of 120 volts, it takes approximately 28 cycles of current to cause heart ventricular fibrillation (AIEE Transactions, Power Apparatus and Systems, No. 50, Oct. 1960, pp. 66–6673, "Threshold 60-cycle Fibrillating Currents," Charles F. Dalziell). Thus it can be seen that although what may be technically termed a shock hazard is present, it is of such short duration as to be relatively harmless. The duration of the shock hazard is short because as soon as the conductor 10 goes positive, the circuit will operate as first set forth above, i.e., there will be circuit interruption.

As described above, the arrangement whereby the third conductor is in the form of a flexible tubular sheath around at least one of the main power conductors has the important advantage of providing a very low inductance current path for ground currents, so as to provide a usable signal to initiate interruption of the circuit when such currents get too high. In addition, however, this structure also has important benefits with respect to the danger of shock and/or fire when a power cord is accidentally cut or damaged.

With prior art power conductors of the type commonly used in the home, if the cord is accidentally cut, such as by abrasion, whether completely severed or not, a portion of the conductor itself may be exposed in such a manner that it may be readily contacted by a person or by a metallic grounded object. In the first case, there is the danger of electrical shock, and in the second case there is the danger of fire starting by reason of sparking conditions. Prior art electrical protective systems do not afford adequate protection against such cord failure hazards, since there is commonly no change in current conditions in the conductors. Thus, for example, if the power consuming device is in the "off" condition, now power will be flowing through the cord at the time. On the other hand, even if power is flowing through the cord, the abrasion or cut may not be such as to actually sever the conductor, so that the current conditions may remain unchanged even though a hazardous condition exists.

In accordance with the present invention, because of the flexible conductor sheath about each of the main power conductors, if cutting or abrasion occurs, the outer sheath comes in contact with at least one of the main power conductors. If this occurs, whether or not power is being drawn by the power consuming device, the protective circuit is actuated because some current flows through the third conductor and initiates "crowbarring" of the device. The two flexible conductive sheaths are preferably tangent to each other and are electrically common at the point of tangency. Thus the tubular conductor which surrounds the power conductor which is carrying the "outgoing" current at the time of a short-circuit between the sheath and one or both of the inner conductors, affords a low inductance return path for such current. In addition, there is also provided electrically in parallel with this tubular conductor another similar tubular conductor, thereby doubling the size of the conductor available to carry such return current. It will be observed that if the two tubular conductors were not electrically in common all along their length at the point of tangency, or were so connected only at spaced intervals, each of the tubular conductors would have to carry such return current entirely for at least a portion of its length.

Although only a single flexible conductive sheath may be used in accordance with the invention, two such sheaths are preferred, one around each power conductor, to maintain full protection regardless of which wire is grounded.

Figure 3:
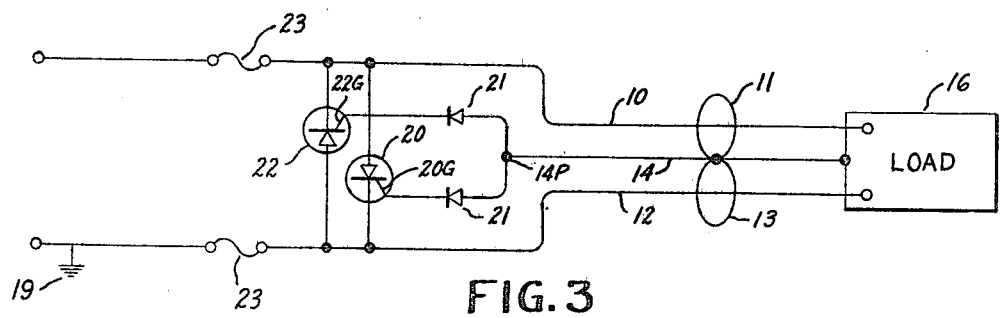
FIGURE 3 is a schematic of another embodiment of the invention.

In FIGURE 3, a circuit is shown which has further advantages over the circuit of FIGURE 1. The circuit of FIGURE 3 is generally similar to FIGURE 1. and like elements are given like numbers. The essential difference between the circuits is that silicon controlled rectifier 17 of FIGURE 1 is replaced by a pair of silicon controlled rectifiers 20 and 22. The silicon controlled rectifiers 20 and 22 are individually connected in shunt across the power conductors 10 and 12 in reverse conducting relation relative to each other, and have their gating elements 20G and 22G individually connected through diodes 21 to a common point 14P on neutral common connection 14. The operation of the circuit of FIGURE 3 is essentially the same as that of FIGURE 1, i.e., fault current flowing in the neutral conductors is used to trigger one or the other of the silicon controlled rectifiers 20 and 22. However, by using oppositely poled silicon controlled rectifiers 20 and 22, the circuit is made safe for all the faults discussed above.

For a fault from conductor 10 of FIGURE 3 to its neutral conductor 11 occurring during a negative portion of the current cycle, neither of the silicon controlled rectifiers 20, 22 are turned on because no gate current flows, but, as above, there is no shock to an ungrounded person because there is no path through him available either to ground or to conductor 12. However, where a grounded person touches the conductor, the silicon controlled rectifier is turned on, crowbarring the circuit. Here, current passes from grounded conductor 12 to ground 19, through the grounded person to enclosure 16 and thence to common neutral connection 14 to the gating element 22G of silicon controlled rectifier 22.

By using the oppositely poled pair of silicon controlled rectifiers of FIGURE 3, all cases wherein the circuit of FIGURE 1 does not crowbar because of the polarity of silicon controlled rectifier 17, are eliminated. Thus, only under conditions where no gate current flows to the silicon controlled rectifiers 11 does the circuit of FIGURE 3 not crowbar. In each of these cases where an ungrounded user is involved he will not receive a shock by being in contact with circuit elements because, as in FIGURE 1, there is no path from the faulted conductor to ground or to the other conductor. In the case where a grounded person is involved, the circuit of FIGURE 3 crowbars in the manner outlined above.

It should be noted, as was alluded to earlier, an additional feature of the invention as incorporated in this circuit is that it will crowbar whenever a grounded person is in contact with the load enclosure 16 or with an exposed neutral conductor notwithstanding the fact that there is no defect in the circuit. This is an important feature because any one in contact with ground is in a potentially dangerous situation. Thus the invention of this circuit provides new protection by warning any user who is in contact with ground of his situation by interrupting the circuit he is using.

It is further noted that in this circuit fuses 23 are located in both conductors 10 and 12. This is done to protect a user in instances where, by accident, the normally ungrounded or "hot" conductor 10 is grounded and the normally grounded wire 12 is not.

Figure 4:
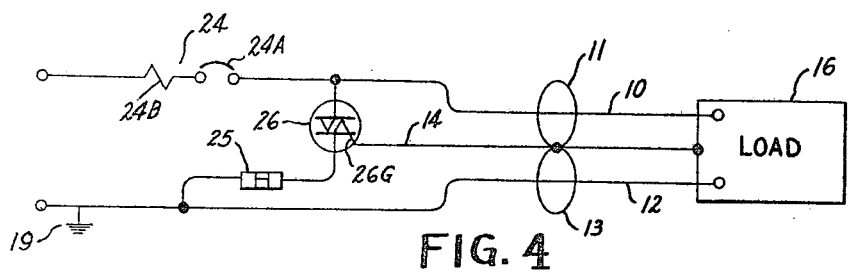
FIGURE 4 is a schematic of still another embodiment of the invention.

In FIGURE 4, a circuit is shown similar to those shown in FIGURES 1 and 3 and like elements are given the same numbers. The essential difference between this circuit and the others is that "a Triac" or bi-directional gate-controlled solid state device 26 is substituted for the silicon controlled rectifiers of FIGURES 1 and 3. FIGURE 4 also shows alternative overcurrent responsive circuit interrupting means in the form of an overcurrent relay 24 comprising movable contact bridging means 24A and an operating coil 24B, but the basic operation of the circuit is not altered by this change. Gating electrode 26G of Triac 26 is connected to neutral conductors 11 and 13 through common connection 14. Triac 26 is connected in shunt across power conductors 1 and 2 through current limiter 25. Current limiter 25, while not essential to operation of this circuit, performs a useful function which is described in detail hereinafter.

This circuit takes advantage of two characteristics of a Triac which differentiate it from a silicon controlled rectifier or from a pair of silicon controlled rectifiers connected back-to-back and having a common gate, as in FIGURE 3. These characteristics are, (1) a Triac can be triggered or turned on irrespective of the polarities of the conductors which it is connected across, i.e., a Triac conducts in both directions and (2) a Triac can be turned on with either positive or negative gating current. These characteristics enable the Triac to trigger under all the fault conditions discussed herein above and thus provide complete crowbarring protection in these instances. For example, considering a fault from conductor 10 to neutral conductor 11 occurring during a negative portion of the current cycle, the circuits of FIGURES 1 and 3 do not crowbar because negative gate current flows to the silicon controlled rectifiers used which does not trigger them. However, when a Triac is used under the same circumstances, this negative current flowing to the gating element 26G will trigger the Triac 26 and thus cause crowbarring.

It is noted that the circuit of FIGURE 4 shares an important characteristic with the circuit of FIGURE 3 in that it crowbars upon a grounded person coming in contact with the load enclosure 16. Here current flows from grounded conductor 12 to ground 19, through the grounded person to the load enclosure and thence to the gating element to trigger Triac 26. Thus, this circuit also provides a warning to users of the circuit that they are in contact with ground.

Figure 5:
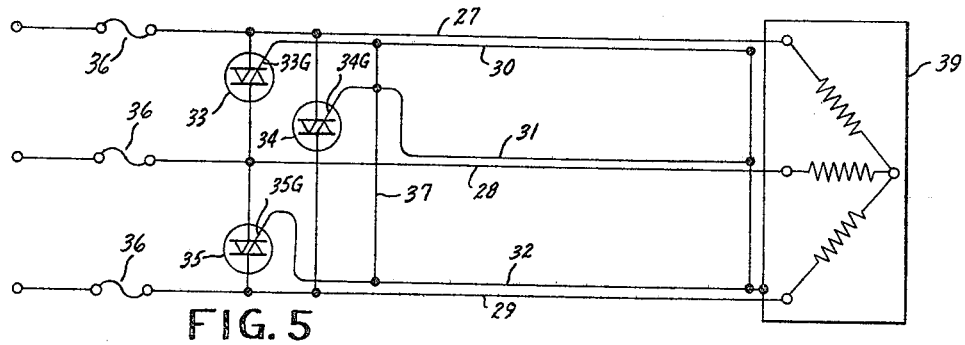
FIGURE 5 is a schematic of a three phase embodiment of the invention.
Figure 6:
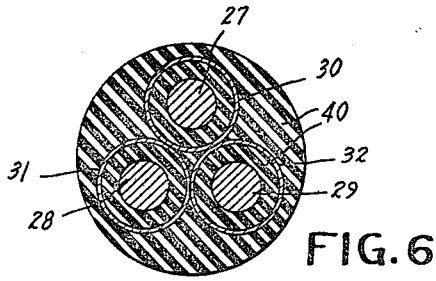
FIGURE 6 is a sectional view of a conductor arrangement to be used with the circuit of FIGURE 5.

A three-phase embodiment of FIGURE 4 is shown in FIGURE 5. It will, of course, be understood that the embodiments of FIGURES 1 and 3 as well as the other single phase embodiments may be adapted for three-phase circuits also. In FIGURE 5, three-phase conductors 27, 28, and 29 feed a load having a frame or enclosure 39 and, in a manner similar to that of the circuit of FIGURE 4, neutral conductors 30, 31, and 32 are formed as metallic sheaths coaxial with phase conductors 27, 28 and 29, respectively, as is best shown in FIGURE 6. The neutral conductors 30, 31 and 32 are electrically common, being tangent to one another (FIGURE 6), as well as being connected together by common connection 37 of FIGURE 5, and are connected to the load enclosure 39. Individual neutral conductors are connected to the gating elements of individual Triacs 33, 34, and 35, i.e., neutral conductor 30 is connected to gating element 33G of Triac 33; neutral conductor 31 is connected to gating element 34G of Triac 34; and neutral conductor 32 is connected to gating element 35G of Triac 35. The Triacs 33, 34 and 35 are connected between pairs of individual power conductors 27, 28, and 29, so that Triac 33 is connected between conductors 27 and 28, Triac 34 is connected between conductors 27 and 29, and Triac 35 is connected between conductors 28 and 29.

The operation of the device of FIGURE 5 is essentially the same as that of FIGURE 4. For example, assuming a fault from conductor 27 to load enclosure 39 occurring on the negative part of the cycle, current flows from conductor 27 to the load enclosure and thence, because of the preferred path phenomenon, through neutral conductor 30 to gating element 33A to turn on Triac 33 and thus to short circuit conductor 27 to conductor 28. Triac 33 is turned on despite the fact that the fault occurs during a negative part of the cycle in contrast to a silicon controlled rectifier, as was explained in connection with FIGURE 4. As was stated, neutral conductor 30 is the preferred path for fault current because it forms the shortest inductance loop with voltage conductor 27, current tends to flow primarily in this conductor, but because the neutral conductors are electrically common, some current flows in the other neutral conductors 31 and 32 to turn on Triacs 34 and 35, respectively, thus shorting out the entire load. Of course, when Triac 33 is turned on any person who is across phase conductor 27 to neutral load is protected by the crowbarring action of Triac 33. Further, by shorting out part of the load increased current will flow into the other two power conductors and thus cause melting of the fuses in all the phases.

Figure 7:
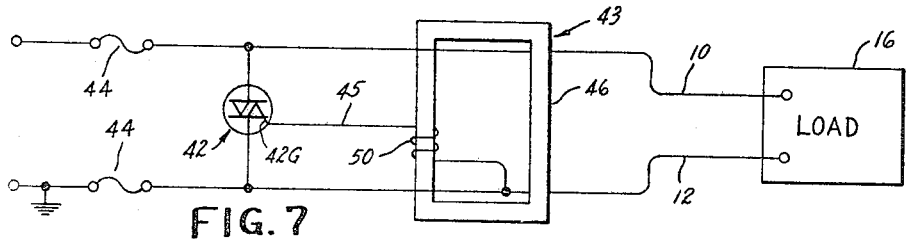
FIGURE 7 is a schematic of another embodiment of the invention.

In FIGURE 7, alternative means responsive to ground faults for turning on the semiconductor control means are shown which are generally designated by the numeral 43 and which include a differential transformer 46 used to detect unbalance in the outgoing and return current paths formed by power conductors 10 and 12. A current unbalance, of course, indicates that some of the line current has found an abnormal or fault return path, as through ground. Fuses 44 are located in both power conductors 10 and 12. As in FIGURE 4, Triac 42 is connected in shunt across power conductors 10 and 12. The gate 42G of the Triac 42 is connected to one end of a secondary winding 50 on the transformer core 46. The other end of the winding 50 is connected to the power conductor 12. It will be appreciated that the differential transformer arrangement may be used as the fault sensing means for any of the semiconductor arrangements shown, and is not limited to use with a Triac.

The operation of the circuit of FIGURE 7 is generally the same as that of FIGURE 4, that is, fault current is used to turn on the Triac to thereby provide a low resistance shunt path between conductors, i.e., crowbarring.

Under normal conditions, there is no voltage and therefore no current flow in the winding 50 since the current in the power conductors 10 and 12 is equal and opposite, so that there is no net flux in the core 46. Thus, there is no current flow to gating electrode 42G and Triac 42 remains in its nonconducting state. Upon a fault, the current in the power conductors 10 and 12 is no longer equal and a voltage is generated in winding 50 and current flows to gating electrode 42G turning on Triac 42, to crowbar the circuit. Crowbarring causes a marked increase in current flow which melts both fuses 44 thus interrupting both power conductors 10 and 12. It is noted that although one fuse or the other will always melt first, the let-through current during arcing, will, on short circuit, be enough to thereafter melt the other one.

The "preferred path" abnormal current detecting system of FIGURES 1–5 is preferred over the "differential transformer" system of FIGURE 7, since the transformer system has the disadvantage that if the conductor 12 becomes grounded or the load side of the protector, then it will not function, since current can pass through a fault to ground and thence back from the ground to the grounded conductor 12, whereby only a small portion of the fault current will by-pass the transformer.

It is noted that semiconductor devices of the type suitable for use in the circuits of the present invention may be damaged or completely destroyed by high current faults and thus must be replaced. To combat such damage or destruction a device known as a current limiter may be employed.

The current limiter used in accordance with the invention is preferably of the type shown in my prior Patent No. 3,117,203, issued Jan. 7, 1964 and assigned to the same assignee as the present invention.

While the construction and operation of this type current limiter is set forth in detail in the aforesaid application, this construction and operation will be described here briefly for the sake of completeness.

Figure 8:
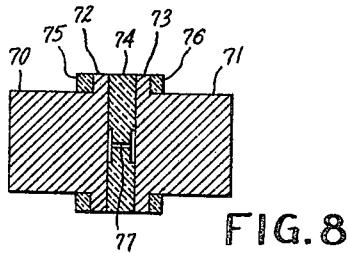
FIGURE 8 is a sectional view of a current-limiting device used in the circuit of FIGURE 4.

Referring to FIGURE 8, the current limiter construction referred to comprises a pair of cylindrical metallic terminal portions 70 and 71, having integral circular flange portions 72, 73 respectively. A circular disc 74 of ceramic material is positioned between the flanges 72, 73 and is securely bonded thereto. A pair of annular rings 75, 76 also of ceramic material, are positioned against the outer surfaces of the flanges 72, 73 and are also securely bonded thereto. The disc 74 has a central opening 77 therethrough having enlarged end portions as shown. Capillary 77 and its enlarged end portions are completely filled with a liquid conducting medium such as mercury, which is contained therein by the terminal numbers 70, 71. A filling opening, and sealing means, not shown, are also included, as described in the aforesaid application.

In operation, under normal conditions, the current limiter has a relatively low resistance, current therethrough passing from the terminal 70 to the terminal 71 through mercury filled capillary 77. On the occurrence of high current conditions, such as short circuit conditions, the mercury in the capillary 77 is suddenly transformed to a vapor state although confined to its initial volume. Conduction through the vapor takes place by an arcing process, but the resistance to current flow therethrough is such as to limit the current to a relatively low value. The current is not permanently interrupted by the current limiter, since after a period in its nonconducting vapor state the current limiter will return to its liquid conducting state.

The current limiter is used in the present invention to limit both the magnitude of current passing through the semiconductor device used, and the time such high magnitude current flows through the device. The withstand level of a semiconductor device of this type, i.e., the amount of current the device can withstand, is a function of both the magnitude of current passed through the device and the time such current passes through. Thus, by the current limiter to keep these quantities within certain limits the withstand level will not be exceeded and the semiconductor device can be reused.

Figure 9:
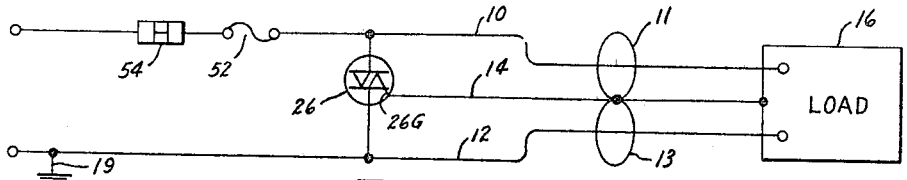
FIGURES 9 and 10 are schematic diagrams of other embodiments using the current-limiting device of FIGURE 8.
Figure 10:
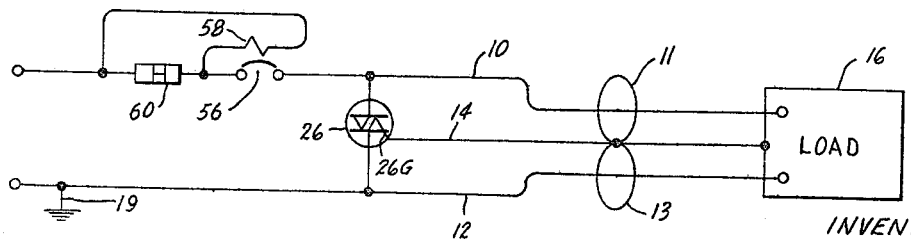

In FIGURES 4, 9, and 10 three embodiments are shown wherein the current limiter is utilized to protect the semiconductor control device used. Although a Triac is utilized in these embodiments it will be appreciated that any other similar device so used could also be so protected.

In FIGURE 4, which has been described in detail above, the current limiter is located in series with Triac 26 in a shunt path between conductors 10 and 12. The operation of FIGURE 2 aside from the operation of the current limiter has also been set forth above.

In FIGURE 4, the current limiter operates in this circuit as follows: Upon a fault, when Triac 26 is turned on by fault current flowing from neutral connection 14, thereby effectively short circuiting the power conductors 10 and 12, short-circuit current flows to the current limiter 25 causing it to suddenly change to its high-resistance state as outlined above. The current limiter 15 "catches" the short-circuit current on the rise and returns it to a low level while the limiter 25 is in its high-resistance state, thus limiting the magnitude of current flowing through the Triac 26, as well as the time that such high current flows therethrough. The circuit breaker 24 should trip during this time but for a slower breaker the current limiter 25 may revert to its low-resistance state before tripping. In this state the limiter 25 will permit the passage of another relatively high current pulse through the Triac 26 but, again, the current limiter 25 will revert to its high-resistance state limiting the magnitude of this pulse before it reaches its full peak and returning to a low value state.

FIGURE 9 is the same as FIGURE 4 and like elements are given the same numbers, except that the current limiter 54 is located in series with power conductor 10 rather than in shunt between the power conductors 10 and 12 and that, much less importantly, relay 24 has been replaced by fuse 52. In this embodiment, short circuit current, caused by the turning on of Triac 26, again "fires" or changes the state of the limiter 54. As above, the current limiter 54 limits the magnitude of current flowing through the semiconductor device 26 by catching the short-circuit current before it reaches full magnitude and the time that high current flows therethrough because during the period when the current limiter is in its high-resistance state only limited current flows. It is noted that in this embodiment, if the fuse hasn't melted by the time the current limiter 54 reverts back to its low-resistance state, then the high current pulse permitted by the current limiter 54 when it returns to this state will itself tend to melt the fuse 52.

In FIGURE 10, the circuit shown is again the same as the circuit of FIGURE 4 except that the current limiter 60 is located in series with power conductor 10 and has shunted across it the operating winding 58 of a circuit breaker 56 also located in series with conductor 10.

Under normal conditions, the limiter 60 is in its liquid conducting state and thus relay winding 58 is effectively short-circuited or bypassed by the limiter 60 which under such conditions has very low resistance. Upon a fault, short circuit current flowing because of the turning on of Triac 26 causes limiter 60 to fire so that its resistance increases greatly, as was outlined above. A portion of the current is therefore diverted to breaker winding 58 to trip circuit breaker 56.

The operation of a current limiter, coil and relay in a different circuit is set forth in detail in my Patent No. 3,258,562, issued June 28, 1966, and assigned to the same assignee as the present invention.

Figure 11:
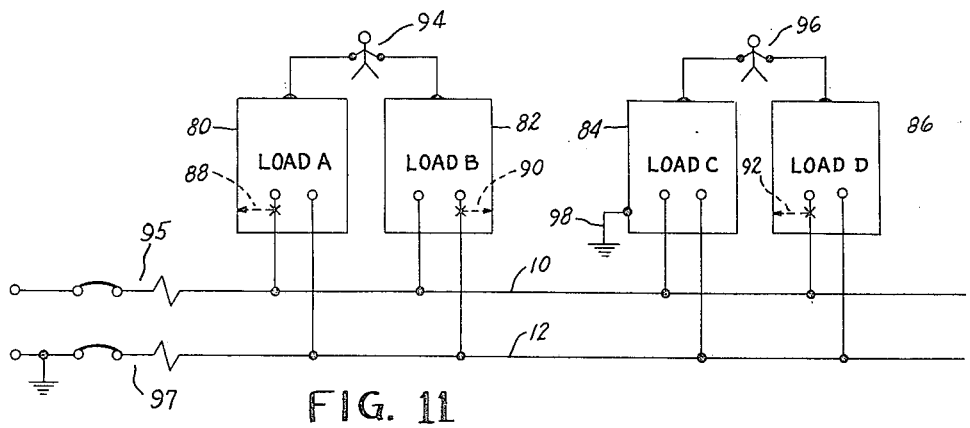
FIGURE 11 is a circuit diagram demonstrating certain faults protected against by the invention.

A circuit is shown in FIGURE 11 which demonstrates a danger from an electric shock in the home which is not generally appreciated, i.e., electric shock resulting from simultaneous contact of two or more appliances, and one which the present invention is uniquely able to combat.

An ungrounded person may operate an appliance having a conductor-to-enclosure fault without passing current and thus without knowledge that it is dangerously defective. However, simultaneous contact with two such devices having faults of opposite polarity defects puts the person across line voltage. This hazard is shown in the upper portion of FIGURE 11 where portable appliances, represented by ungrounded loads A and B are connected to the power conductors 10 and 12. In load A, a fault, designated by numeral 88, exists from the lead from power conductor 10 to the load enclosure 80 whereas in load B there is a fault 90 from the lead from power conductor 12 to the load enclosure 82. A person represented by switch 94 is shown in contact with both loads. It is noted that this ungrounded person can operate either of the above defective appliances without receiving a shock but under the circumstances shown, that is, where he is in contact with both appliances there is serious danger from hand to body to hand current, i.e., current will flow from conductor 10 through fault 88 to load enclosure 80 through the person 94 to load enclosure 82 through fault 90 to conductor 12.

In the lower part of FIGURE 11 a portable appliance represented by grounded load C, and an ungrounded appliance, represented by ungrounded load D, are shown. The grounded appliance, load C, could be a range, food dispenser, dishwasher, washing machine, or another installed appliance. Load D is shown having a conductor-to-enclosure fault 92. An ungrounded person can operate ungrounded appliance, load D, without shock, but is in serious danger if he contacts both at once even though grounded appliance, load C, is not defective, in that he is connected directly from conductor 10 through fault 92 and load enclosure 86, to ground, through grounded enclosure 84.

Further, contact with one of the above-named grounded appliances by a person simultaneously holding a portable appliance would be natural and commonplace. Thus, the hazard is more dangerous because of the greater likelihood of its occurrence.

The protective circuits of the invention except FIGURE 7 are uniquely able to cope with the problems presented by inter-appliance hazards. It is noted that even if circuit breakers 95 and 97 were provided with conventional means for leakage detection, such means would not sense the portable-portable hazard because no current flows to ground, and there is no unbalance between the currents flowing and conductors 1 and 2 to detect. Thus conventional ground fault and current unbalance sensing would be thwarted. However, the circuits of the present invention because they use a third wire, i.e., common neutral connection 14, directly connected to the device enclosure, are sensitive to faults of this kind and will cause crowbarring and circuit interruption for either type of hazard.

Triacs are superior to silicon controlled rectifiers as a crowbarring element in the circuits of the present invention for most applications because their operation is independent of the manner in which they are connected across the system conductors, i.e., independent of polarity considerations, because they will trigger in response to both positive and negative gating current and because they are able to withstand significantly greater amounts of current through them. However, there is one rather serious drawback to using the Triac. In ground fault detection, this being that presently commercially available, Triacs require gating current of more than 50 milliamperes for triggering. Thus, to use a Triac as the crowbarring element in my circuits wherein it is desired to provide protection against fault currents in the microampere range it is necessary to provide amplification of the gating signal in order to trigger the Triac. Silicon controlled rectifiers are presently commercially available which require only approximately 20 microamperes of gating current to trigger. Thus by using silicon controlled rectifiers in a trigger amplifier system for the Triac, the sensitivity of the Triac crowbar arrangement can be greatly enhanced. Such a system has a relatively large energy or "$I_2t$" (I=current, $t$=time duration of fault) withstand ability and thus can be used with much greater loads than a simple silicon controlled rectifier circuit can. For example, it has been found that use of the least expensive silicon controlled rectifiers, if fuse protected, limits the load which may be used to approximately 120 watts. However, by using the least expensive Triac, which costs approximately the same as the least expensive silicon controlled rectifier, a load of 720 watts may be used, i.e., a load six-fold greater than that permitted by the silicon controlled rectifier. Thus, a circuit employing a Triac crowbar arrangement with a silicon controlled rectifier trigger amplifier combines a high sensitivity with relatively high load capacity.

Figure 12:
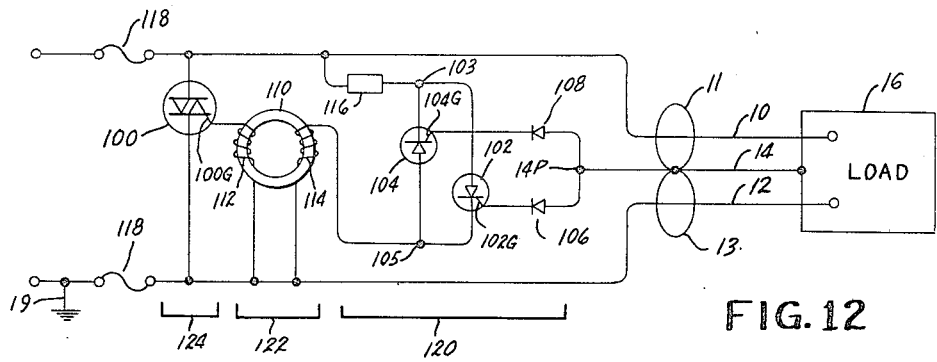
FIGURES 12 and 13 show schematics of two other embodiments of the invention which combine features of certain of the previous embodiments.

A circuit embodying this aspect of the present invention is shown in FIGURE 12. A single phase system comprising power conductors 10 and 12 feeding a load is characterized by the fact that neutral conductors 11 and 13 are formed as coaxial sheaths individually surrounding the power conductors 10 and 12, respectively. Neutral conductors 11 and 13 are electrically common and a common connection 14 is connected to the load enclosure as well as to the input of the crowbar circuit. The crowbar circuit is made up of three sections, trigger amplifier, section 120; coupling, section 122; and Triac crowbar, section 124. The heart of the trigger amplifier, section 120 is a pair of oppositely-poled parallel connected silicon controlled rectifiers 102 and 104 which shunt the power conductors 10 and 12. A pair of diodes 106 and 108 are connected from a common point 14P on common connection 14 to the gating elements 102G and 104G of silicon controlled rectifiers 102 and 104, respectively. The "shunting portion" of the circuit consists of a connection from conductor 10 through a limiting resistor 116 to a first common point 103 of the parallel connection of silicon controlled rectifiers 102 and 104, through the silicon controlled rectifiers to a second common point 105, and thence through transformer primary 114 of coupling transformer 110 to conductor 12. The secondary 112 of transformer 110 is connected to the gating element 100G of Triac 100 which is also connected in shunt across power conductors 10 and 12. Fuses 118 are located in series with the power conductors 10 and 12.

The operation of the device is as follows: Assume a fault from conductor 10 to load enclosure 16 and assume the fault occurs during a positive portion of the current cycle. Fault current prefers, because of its relatively lower inductance, a path through neutral conductor 11 and common connection 14 and thus flows from conductor 10 to the load enclosure 16 and thence through neutral conductor 11 and common connection 14, common point 14P, and diode 106 to gating element 102G to turn on silicon controlled rectifier 102. Silicon controlled rectifier 102 in its conducting state provides a shunt path between conductors 10 and 12, the current flowing in the shunt path being limited by the value of resistor 116. This current flows in primary winding 114 of transformer 110 and is picked up by the secondary winding 112 and passed to gating element 100G to turn on Triac 100 and thus provide what is essentially a short circuit between conductors 10 and 12. Short circuiting of conductors 10 and 12 causes a marked increase in current flow which causes melting of fuses 118. In the case of a fault from conductor 12 to the load enclosure 16, operation would be in the same, but would occur during the half cycle of current in which conductor 12 is positive.

Figure 13:
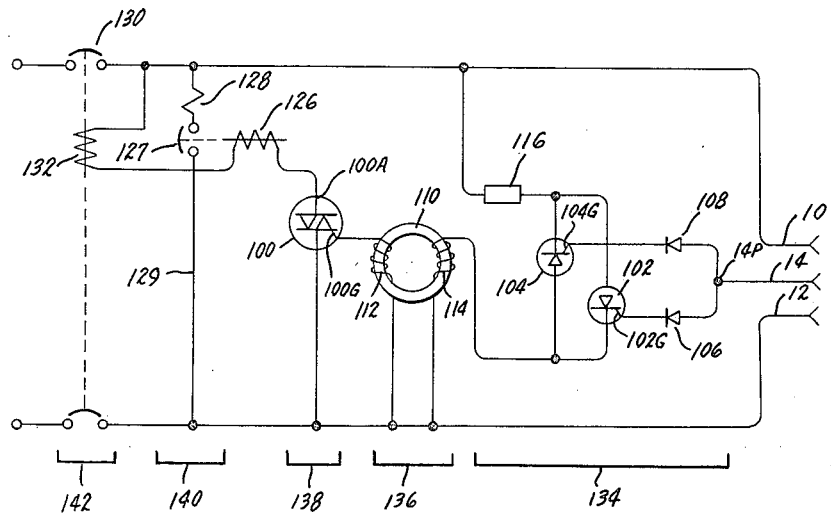

The circuit of FIGURE 13 is a refinement of the circuit of FIGURE 12 and similar elements are given the same numbers. In this circuit two more sections are added to the circuit of FIGURE 12, these being a high-capacity, high-speed, shunt coil closed contactor for a shunt connection across power conductors 10 and 12 and a shunt coil opened, manually reclosed two-pole breaker 130 for power conductors 10 and 12. The trigger amplifier and Triac sections are the same as those of FIGURE 12 but here the terminal 100A of Triac 100 is connected in series with two shunt relay coils 126 and 132. Shunt coil 126 when energized closes a relay 127 located in a shunt connection 129 across power conductors 10 and 12. Shunt connection 129 also includes a series-connected holding coil 128 for relay 127. Shunt coil 132 when energized, opens a two-pole circuit breaker 130 for power conductors 10 and 12. The triggering operation for Triac 100 is the same as in FIGURE 12 but here the resultant current flow caused by the turning on of Triac 100 energizes shunt coil 126 to complete the circuit of shunt connection 129 and energizes shunt coil 132 to open two-pole circuit breaker 130.

The over-all circuit of FIGURE 13 provides a very sensitive detector and amplifier safe from all faults described above, which includes an ultra-fast, medium capacity first stage crowbar, a high-speed, high capacity second stage crowbar and a standard-speed or highspeed circuit breaker. The device is very sensitive because by using the silicon controlled rectifier detector and trigger amplifier arrangement, sensitivity up to 20 microamperes may be achieved with commercially available silicon controlled rectifiers. The ultra-fast, medium-capacity first state crowbar is provided by Triac 100 which in response to the circuit fault sensing means causes short circuiting of the power conductors 10 and 12 within less than 10 microseconds after initiation of the fault. The high-speed, high-capacity second state crowbar is provided by shunt 129 and its associated relay 127 which closes within less than 300 microseconds and, because of the nature of the device, has much greater current capacity than a semiconductor device such as a Triac. The standard or high speed circuit breaker is circuit breaker 130 which, if chosen to be of standard speed, opens within approximately 16 milliseconds or if high speed, with 1 millisecond. Thus by providing two kinds of crowbarring as well as circuit breaker interruption this circuit furnishes ultra-fast operation without sacrificing either power handling capacity or sensitivity.

In conclusion, in view of the foregoing, it can be readily seen that the present invention has many advantages. Semiconductor devices suitable for use in the subject device such as silicon controlled rectifiers can be made to be sensitive to levels of current below the threashhold of perception by human beings, roughly about 0.2 ma. Further, these devices are extremely fast acting, there being silicon controlled rectifiers which break down, i. e., turn on, within 1/100,000 of a second. These characteristics are obviously important in that they permit the subject device to be set to respond at levels where currents are only vaguely perceived and thus prevent any discomfort to the user, and to act so fast that even high level currents cannot cause harm.

Of course, the level of protection to be provided by the subject device is a matter of choice. In instances where home appliances have a continous leakage current of a certain harmless value it might be desired to choose a semiconductor which will respond to currents above that value, to prevent trippage when that appliance is used. In this regard, it might be desired to make the response level of the control circuit adjustable. This may be done by adding a variable resistor to the gating circuit of the semiconductor thus permitting variation of the minimum trip current.

The subject device is also quite inexpensive, the only parts required, in its simplest form, being a silicon controlled rectifier or a Triac, a fuse, and the special cable, which itself may be inexpensively made. Further, the device is so compact that the circuit interrupting means, the silicon controlled rectifier and the fuse, may be built into a standard wall plug.

While I have disclosed only specific embodiments of the invention, it will be readily appreciated that many modifications thereof may be made within the scope of the invention.

What I claim as new and desire to secure by Letters Patent of the United States is:

1. An electric power utilization system comprising:
   (a) an electric power consuming device including an input terminal, and output terminal, an electrical conducting means normally connected between said input and output terminals when said device is in use;
   (b) said power consuming device also having a second electrically conductive portion normally electrically insulated from at least said input terminal when said device is in use;
   (c) first and second elongated power conductors connected to said input and output terminals respectively for conducting power to and from said power consuming device;
   (d) automatic circuit interrupting means connected electrically in series with one of said elongated power conductors;
   (e) automatically operable switching means connected between said first and second conductors at a point between said circuit interrupting means and said power consuming device;
   (f) third conductor means connected at one end to said second electrically conductive portion of said power consuming device;
   (g) means responsive to flow of current between said third conductor and at least one of said first and second conductors for initiating operation of said automatically operable switching means to short-circuit said first and second conductors and to cause actuation of said automatic circuit interrupting means to interrupt said circuit.

2. An electric power utilization system as set forth in claim 1 wherein said means responsive to flow of current between said third conductor and at least one of said first and second conductors comprises means operable upon the occurrence of current flow of .5 milliampere or more at 60 cycles.

3. An electric power utilization system as set forth in claim 1 wherein said automatically operable switching means comprises a three electrode solid state electrical control device.

4. An electric power utilization system as set forth in claim 1 wherein said automatically operable switching means comprises a three electrode solid state device, and a current limiting device connected electrically in series with said solid state device, said current limiting device having the characteristic of changing suddenly from a low resistance state to a high resistance state upon the occurrence of predetermined current conditions therethrough.

5. An electric power utilization system as set forth in claim 1 wherein said automatically operable switching means comprises a silicon controlled rectifier.

6. An electric power utilization system as set forth in claim 1 wherein said automatically operable switching means comprises a first controlled rectifier connected between said first and second conductors and disposed to control current flow from said first to said second conductor and a second controlled rectifier connected between said first and second conductors and disposed to control current flow from said second to said first conductor.

7. An electric power utilization system as set forth in claim 1 wherein said automatically operable switching means comprises a three electrode solid state switch capable of controlling current flow in either direction therethrough between two of said electrodes in response to the presence of a signal applied to the third of said electrodes.

8. An electric power utilization system as set forth in claim 1, said system also comprising a third electrode and said power utilization system comprising a third power conductor and an automatically operable switching means between each pair of said power conductors to provide a three-phase power system.

9. An electric power utilization system comprising:
   (a) an electric power consuming device including an input terminal, an output terminal, an electrical conducting means normally connected between said input and output terminals when said device is in use;
   (b) said power consuming device also having a second electrically conductive portion normally electrically insulated from at least said input terminal when said device is in use;
   (c) first and second elongated power conductors connected to said input and output terminals respectively for conducting power to and from said power consuming device;
   (d) automatic circuit interrupting means connected electrically in series with one of said elongated power conductors;
   (e) automatically operable switching means connected between said first and second conductors at a point between said circuit interrupting means and said power consuming device;
   (f) current differential measuring means for detecting an unbalance of currents in said first and second conductors, and means connecting said current differential detecting means to said automatically operable switching means to operate said automatically operable switching means to short-circuit said first and second conductors and cause actuation of said circuit interrupting means.

10. An electric power utilization system comprising:
    (a) an electric power consuming device including an input terminal, an output terminal, an electrical conducting means normally connected between said input and output terminals when said device is in use;
    (b) said power consuming device also having a second electrically conductive portion normally electrically insulated from at least said input terminal when said device is in use.
(c) first and second elongated power conductors connected to said input and output terminals respectively for conducting power to and from said power consuming device;
(d) automatic circuit interrupting means connected electrically in series with at least one of said elongated power conductors;
(e) trip initiating means for initiating automatic opening operation of said circuit interrupting means;
(f) first automatically operable electric switching means connected between said first and second conductors, said first automatically operable switching means comprising solid state electronically operating switching means;
(g) means for operating said first automatically operable switching means from non-conducting to conducting condition upon the occurrence of ground fault conditions in said system;
(h) electric signal generating means connected electrically in series with said first automatically operable switching means and operable to generate an electrical signal upon the passage of current through said first automatically operable switching means;
(i) second automatically operable switching means connected between said first and second power conductors;
(j) means connecting said electrical signal to said second automatically operable switching means to cause automatic operation of said second automatically operable switching means from non-conducting to conducting condition;
(k) means connected electrically in series with said second automatically operable switching means for causing actuation of said automatic circuit interrupting means.

11. An electric power utilization system as set forth in claim 10 wherein said system also includes an energizing coil connected electrically in series with said second automatically operable switching means and a movable contact member movable in response to energizing of said coil to complete a circuit electrically short-circuiting said first and second electrical conductors.

12. An electric power utilization system as set forth in claim 11 wherein said first automatically operable switching means comprises a pair of controlled rectifiers connected in reverse conducting parallel relation, and said second automatically operable switching means comprises a Triac.

13. An electric power utilization system for connecting an electric power consuming load to a source of electric power comprising:
(a) first and second elongated power conductors for conducting electric power to and from said load respectively;
(b) a third elongated power conductor;
(c) insulating means supporting said first, second and third power conductors in closely-spaced insulated parallel relation;
(d) automatically operable electric circuit opening means connected electrically in series with a least one of said first and second power conductors, said automatically operable electric circuit opening means being operable upon the occurrence of predetermined current conditions in said one of said conductors to disconnect at least said one conductor from said source of electric power;
(e) automatically operable electric circuit closing means connected across said first and second power conductors, said automatically operable circuit closing means being normaly in open condition;
(f) means operable upon the occurrence of predetermined current flow in said third conductor for closing said circuit closing means to cause the flow of predetermined current in said one electric power conductor and to cause automatic opening of said automatically operable electric circuit opening means.

14. An electric power utilization system as set forth in claim 13 wherein said automatically operable electric circuit closing means comprises a three-electrode solid-state electronic control device having an anode, a cathode and a control terminal, said anode and cathode each being connected to one of said first and second power conductors and said control terminal being connected to said third power conductor.

15. An electric power utilization system as set forth in claim 14 wherein said electronic control device comprises a bi-directional conducting device.

16. An electric power utilization system as set forth in claim 13 wherein said third conductor comprises a flexible conductive sheath surrounding at least one of said first and second power conductors.

17. An electric power utilization system as set forth in claim 13 wherein said third conductor comprises a pair of flexible conductive sheaths each surrounding one of said first and second power conductors and means connecting said sheaths electrically in common.

18. An electric power utilization system as set forth in claim 13 wherein said source of electric power comprises a three-phase source and said load comprises a three-phase load, said system also comprising:
(a) a fourth elongated power conductor for coopererating with said first and second power conductors to conduct power to and from said three-phase load;
(b) three automatically operable electric circuit closing means connected between said first and second power conductors said first and fourth power conductors and said second and fourth power conductors respectively; and
(c) automatically operable circuit opening means connected electrically in series with each of said first, second and fourth power conductors respectively.

19. An electric power utilization system comprising:
(a) an electric power consuming device including an input terminal, an output terminal, and electrical conducting means normally connected between said input and output terminals when said device is in use;
(b) said power consuming device also having a second electrically conductive portion normally electrically insulated from at least said input terminal when said device is in use;
(c) first and second elongated power conductors connected to said input and output terminals respectively for conducting power to and from said power consuming device;
(d) automatic circuit interrupting means connected electrically in series with one of said elongated power conductors;
(e) trip initiating means for initiating automatic opening operation of said circuit interrupter;
(f) third conductor means extending along and in closely spaced relation to at least one of said first and second power conductors to provide a relatively low inductance return path for current in said one conductor;
(g) means connecting one end of said third conductor to said second electrically conductive portion of said power consuming device;
(h) means connecting said trip initiating means between the other end of said third conductor and one of said first and second conductors, to cause actuation of said trip initiating means upon the flow of predetermined current from said third conductor to said one of said first and second conductors; and
(i) said trip initiating means comprising an automatically operable switching means connected between said first and second power conductors at a point between said circuit interrupting means and said power consuming device and means responsive to flow of current between said third conductor and at least one of said first and second conductors for initiating operation of said automatically operable switching means to short-circuit said first and second conductors and to thereby cause actuation of said automatic circuit interrupting means to interrupt said circuit.

20. An electric power utilization system as set forth in claim 19 wherein said automatically operable switching means comprises a three electrode solid state electric power control device.

21. An electric power utilization system as set forth in claim 19 wherein said automatically operable switching means comprises means responsive to current flow of .5 milliampere or more.

22. An electric power utilization system as set forth in claim 19 wherein said automatically operable switching means comprises a silicon-controlled rectifier.

References Cited

UNITED STATES PATENTS

| | | | |
|---|---|---|---|
| 1,257,452 | 2/1918 | Bowden et al. | 317—45 |
| 1,337,866 | 4/1920 | Whitaker | 317—45 |
| 2,478,147 | 8/1949 | Wilson | 317—44 |
| 3,353,066 | 11/1967 | De Souza | 317—16 X |

LEE T. HIX, Primary Examiner

J. D. TRAMMELL, Assistant Examiner

U.S. Cl X.R.

174—102; 317—18, 27, 31, 33, 45